US007004116B2

(12) United States Patent
Allen (10) Patent No.: US 7,004,116 B2
(45) Date of Patent: Feb. 28, 2006

(54) FOUR STROKE AUTO-IGNITION ENGINE

(75) Inventor: Jeffrey Allen, Norfolk (GB)

(73) Assignee: Lotus Cars Limited, Norfolk (GB)

( * ) Notice: Subject to any disclaimer, the term of this patent is extended or adjusted under 35 U.S.C. 154(b) by 0 days.

(21) Appl. No.: 10/474,328

(22) PCT Filed: Apr. 19, 2002

(86) PCT No.: PCT/GB02/01829

§ 371 (c)(1),
(2), (4) Date: Oct. 8, 2003

(87) PCT Pub. No.: WO02/086297

PCT Pub. Date: Oct. 31, 2002

(65) Prior Publication Data

US 2004/0112307 A1    Jun. 17, 2004

(30) Foreign Application Priority Data

Apr. 19, 2001  (GB) .................................. 0109664

(51) Int. Cl.
*F02D 13/02*    (2006.01)
*F01L 9/02*    (2006.01)
*F02B 1/14*    (2006.01)
(52) U.S. Cl. ............... 123/27 R; 123/531; 123/568.14; 123/299
(58) Field of Classification Search ........... 123/568.14, 123/27 R, 531, 299, 295, 308
See application file for complete search history.

(56) References Cited

U.S. PATENT DOCUMENTS 6,082,342 A    7/2000 Duret et al.

| | | | |
|---|---|---|---|
| 6,497,213 B1 * | 12/2002 | Yoshizawa et al. | 123/299 |
| 6,543,411 B1 * | 4/2003 | Raab et al. | 123/568.14 |
| 6,612,294 B1 * | 9/2003 | Hiraya et al. | 123/568.14 |
| 6,640,773 B1 * | 11/2003 | Ancimer et al. | 123/299 |
| 6,708,680 B1 * | 3/2004 | Lavy et al. | 123/308 |
| 6,718,957 B1 * | 4/2004 | Kakuho et al. | 123/568.14 |
| 6,807,956 B1 * | 10/2004 | Schiemann et al. | 123/568.14 |

FOREIGN PATENT DOCUMENTS

| EP | 0 748 929 A1 | 12/1996 |
|---|---|---|
| EP | 1 048 833 A2 | 11/2000 |
| GB | 2 277 776 A | 11/1994 |
| GB | 2 313 623 A | 12/1997 |
| WO | WO 96/03578 | 2/1996 |

\* cited by examiner

*Primary Examiner*—Henry C. Yuen
*Assistant Examiner*—Arnold Castro
(74) *Attorney, Agent, or Firm*—Fulwider Patton LLP (57) ABSTRACT

The present invention relates to a method of operating a four-stroke internal combustion engine comprising the steps of: closing an exhaust valve prior to the end of the exhaust stroke to trap combusted gases in a combustion chamber; opening an inlet valve during the intake stroke to admit charge into the combustion chamber to be mixed with previously trapped combustion gases; and using an injector to inject fuel into the mixture of the trapped combusted gases and the charge air. In the combustion chamber conditions are generated which enable the mixture of fuel, air and combusted gases to combust by auto-ignition. The injector is additionally used to inject fuel into the trapped combusted gases after closing of the exhaust valve during the exhaust stroke and prior to opening of the inlet valve in the induction stroke.

15 Claims, 5 Drawing Sheets

FOUR STROKE AUTO-IGNITION ENGINE

This is a National Phase Application in the United States of America of International Application PCT/GB02/01829 filed 19 Apr. 2002, which claims priority from British Patent Application No. 0109664.3 filed 19 Apr. 2001.

The present invention relates to a four-stroke internal combustion engine.

Increasingly stringent fuel economy and emissions targets are being imposed by government legislation. These and consumer pressures continually force the automotive industry to investigate new ways of improving the combustion process of the internal combustion engine.

Once such approach is the auto-ignition (AI) process. In this process a mixture of combusted gases, air and fuel is created which ignites without the need for a spark during compression. The process is sometimes called self-ignition. It is a controlled process and thus differs from the undesirable pre-ignition which has been known in some spark-ignition engines. It differs from compression ignition in diesel engines because in a diesel engine the diesel fuel ignites immediately on injection into a pre-compressed high temperature charge of air, whereas in the auto-ignition process the fuel and air and combusted gases are mixed together prior to combustion. Use of the auto-ignition process in two-stroke engines is well known. The present invention relates to the application of this process to a four-stroke internal combustion engine.

In U.S. Pat. No. 6,082,342 there is described a four-stroke internal combustion engine which has an electro-hydraulically controlled exhaust valve controlling flow of combusted gases from a variable volume combustion chamber defined by a piston reciprocating in a cylinder, the exhaust valve being closed before the end of the exhaust stroke to keep in the combustion chamber combusted gases for mixing with subsequently introduced fuel/air charge. The exhaust valve is operated to trap combusted gases for mixing with a fuel/air charge to create conditions in the combustion chamber suitable for operation of an auto-ignition process. U.S. Pat. No. 6,082,342 also describes an engine with mechanical cam activated exhaust valves with an opening period which is elongated with respect to the opening period of a conventional spark ignition combustion engine so that there is an overlap period when both the air inlet valve and an exhaust valve of a combustion chamber are simultaneously open during an induction stroke so that both a fuel/air charge and combusted gases are drawn into the combustion chamber. Again this is done to promote conditions in the combustion chamber suitable for auto-ignition. In all embodiments described in U.S. Pat. No. 6,082,342 fuel and air are delivered together to the combustion chamber under the control of an inlet valve or valves.

It is sometimes difficult to generate conditions suitable for auto-ignition when an engine is operating in light load conditions. The temperatures and pressures in the combustion chamber may not be high enough in light load conditions for auto-ignition to occur.

The present invention provides a method of operating a four-stroke internal combustion engine comprising the steps of: using inlet valve means to regulate flow of air into a combustion chamber; using exhaust valve means to regulate flow of combusted gases from the combustion chamber; using injection means to inject fuel directly into the combustion chamber; closing the exhaust valve means prior to the end of the exhaust stroke to trap combusted gases in the combustion chamber; opening the inlet valve means during the intake stroke to admit charge into the combustion chamber to be mixed with the previously trapped combusted gases; and using the injection means to inject fuel into the mixture of the trapped combusted gases and the charge air introduced during the intake stroke under control of the inlet valve means; whereby in the combustion chamber conditions are generated which enable the mixture of fuel, air and combusted gases to combust by auto-ignition with the combusted gases expanding during the power stroke; wherein the injection means is additionally used to inject fuel into the combusted gases trapped in the combustion after closing of the exhaust valve means during the exhaust stroke and prior to opening of the inlet valve means in the next intake stroke; characterised in that the injection means used comprises an air assist fuel injector which uses compressed air to entrain fuel to be delivered into the combustion chamber.

In a second aspect the present invention provides a method of operating a four stroke internal combustion engine comprising the steps of: using inlet valve means to regulate admission of a mixture of fuel and air into a combustion chamber; using a compressor to compress the fuel and air mixture prior to admission of the mixture into the combustion chamber; using exhaust valve means to regulate flow of combusted gases from the combustion chamber; closing the exhaust valve means prior to the end of the exhaust stroke to trap combusted gases in the combustion chamber; opening the inlet valve means during the intake stroke to admit a charge of fuel and air mixture into the combustion chamber to be mixed with the previously trapped combusted gases; whereby in the combustion chamber conditions are generated which enable combustion of the mixture of fuel, air and combusted gases by auto-ignition, with the combusted gases expanding during the power stroke; characterised by opening the inlet valve means to admit a preconditioning charge of fuel and air into the combustion chamber to be mixed with the trapped combusted gases after closing of the exhaust valve means during the exhaust stroke and prior to the opening of the inlet valve means in the induction stroke to admit the charge of fuel and air which is combusted to expand in the power stroke.

A plurality of embodiments of engines operating according to methods of the present invention will be described with reference to the following figures.

For simplicity, the detailed description following will address the method of the present invention in its application to a single cylinder four-stroke internal combustion engine, although it should be appreciated that the present invention is equally applicable to a multicylinder four-stroke internal combustion engine.

Figure 1:
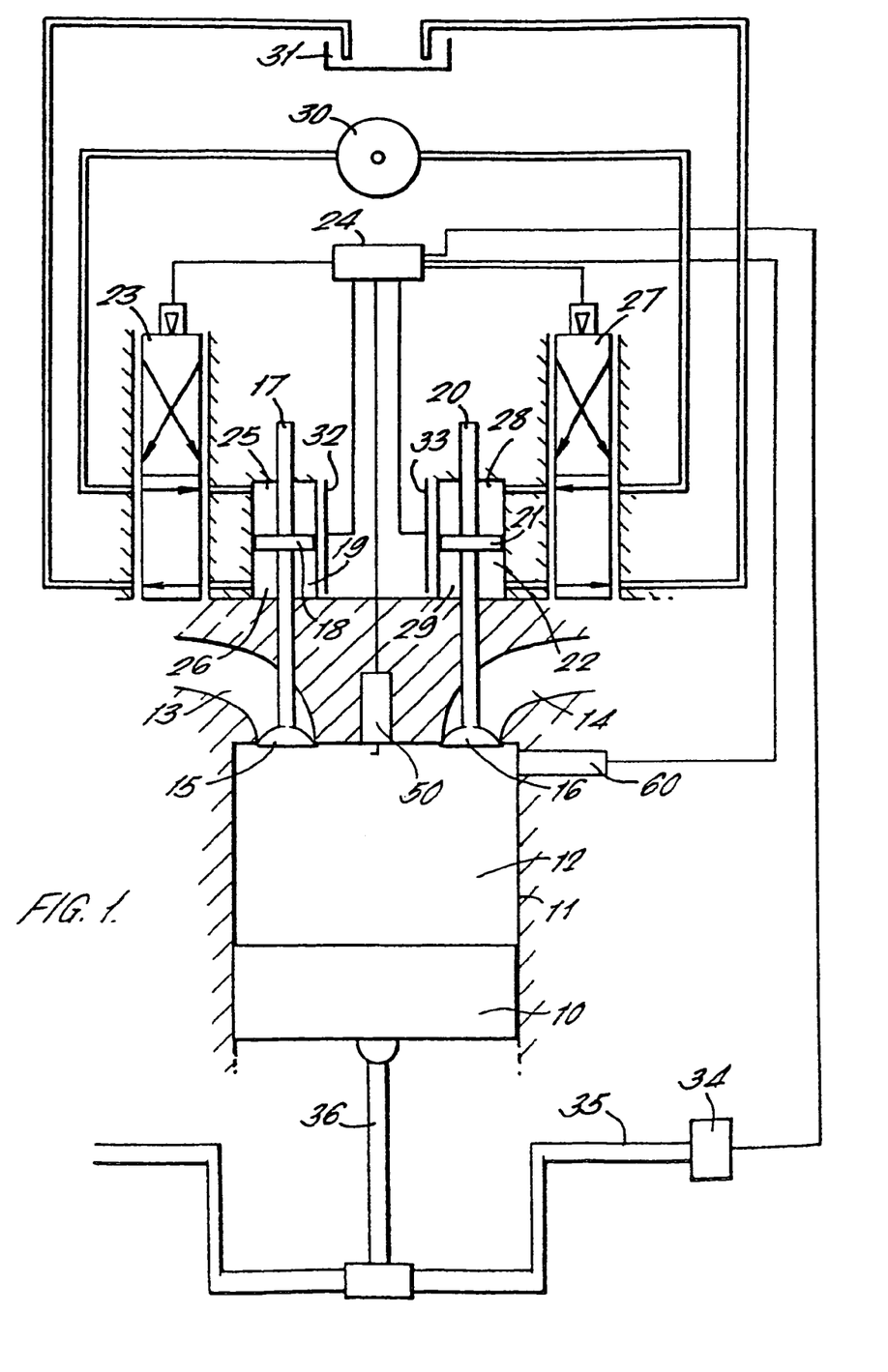
FIG. 1 is a schematic illustration of a first embodiment of a single cylinder four-stroke engine.

A schematic representation of a first embodiment of a single-cylinder four stroke internal combustion engine is given in FIG. 1. In the Figure a piston 10 is movable in a cylinder 11 and defines with the cylinder 11 a variable volume combustion chamber 12.

An intake passage 13 supplies air into the combustion chamber 12. The flow of the air into the combustion chamber 12 is controlled by an intake valve 15.

A gasoline direct injector 60, controlled by an electronic controller 24, is used to inject fuel directly into the combustion chamber 12. The gasoline direct injector 60 is an air assist gasoline direct cylinder 60 which uses compressed air (e.g. compressed by a pump (not shown)) to entrain fuel into the combustion chamber 12.

Combusted gases can flow from the combustion chamber 12 via an exhaust passage 14 and flow of combusted gases through the exhaust passage 14 is controlled by the exhaust valve 16.

The inlet valve 15 and the exhaust valve 16 are hydraulically actuated. It can be seen in the Figure that the stem 17 of the inlet valve 15 has provided thereon a piston 18 which is movable in a cylinder 19. Similarly, the stem 20 of the exhaust valve 16 has a piston 21 provided thereon which is movable in a cylinder 22.

Flow of hydraulic fluid to the cylinder 19 is controlled by a servo-valve 23. The servo-valve 23 is electrically controlled. This servo-valve 23 is controlled by control signals generated by the electronic controller 24. The servo-valve 23 can control hydraulic fluid to flow into an upper chamber 25 of an arrangement of the piston 18 and the cylinder 19 whilst controlling flow of hydraulic fluid out of a lower chamber 26. The servo-valve 23 can also control flow of hydraulic fluid to and from the cylinder 19 such that hydraulic fluid is delivered to the bottom chamber 26 whilst hydraulic fluid is expelled from the upper chamber 25. The fluid supplied to and expelled from the cylinder 19 is metered, so as to control exactly the position and/or velocity of the inlet valve 15.

In a similar fashion, a servo-valve 27 is provided to control flow of hydraulic fluid to and from the cylinder 22. The servo-valve 27 is controlled electrically by the electronic controller 24. The servo-valve 27 can operate to supply hydraulic fluid under pressure to an upper chamber 28 of a cylinder 22 whilst allowing hydraulic fluid to be expelled from the lower chamber 29 of the cylinder 22. Conversely, the servo-valve 27 can allow pressurised hydraulic fluid to be supplied to the lower chamber 29 whilst allowing hydraulic fluid to be expelled from the upper chamber 28. The servo-valve 27 meters the flow of hydraulic fluid to and from the cylinder 22 in order to control the position and/or the velocity of the exhaust valve 16.

Both of the servo-valves 23 and 27 are connected to a pump 30 and a sump 31. Hydraulic fluid under pressure is supplied by the pump 30 and when hydraulic fluid is expelled from either or both of the cylinders 19 and 22 it is expelled to the sump 31. The pump 30 will in practice draw fluid from the sump 31 to pressurise the fluid and then supply the pressurised fluid to the servo-valves 23 and 27.

The electronic controller 24 will control the movement of the inlet valve 15 and exhaust valve 16 having regard to the position of the inlet and exhaust valves 15 and 16 as measured by two position transducers 32 and 33. The controller 24 will also have regard to the position of the engine, which will be measured by a rotation sensor 34 which is connected to a crank shaft 35 of the internal combustion engine, the crank shaft 35 being connected by a connecting rod 36 to the piston 10 reciprocating in the cylinder 11.

The engine of the present invention has a hydraulically controlled valve train with an electronic controller 24 which is programmable and hydraulically controls the opening and closing of both the inlet 15 and exhaust 16 valves. This enables control of the motion of the inlet 15 and exhaust 16 valves and in particular the time (in terms of the engine cycle) when the inlet 15 and exhaust 16 valves open and the duration of time for which they are open.

Conventional four-stroke internal combustion engines have cam shafts which drive the inlet and exhaust valves. The cam shafts have cam profiles which are designed to maximise the gas flow through the engine. Such engines rely on a spark plug to ignite the mixture. They also rely on an intake throttle to reduce gas flow and therefore control the power output of the engine.

In an engine according to the first embodiment of the present invention the movement of the inlet 15 and exhaust 16 valves will be used for total gas flow management, controlling both the amount of air flowing into and out of the combustion chamber 12 during each stroke of the engine and also controlling the internal mixing process between the different gas species inside the combustion chamber 12 and also to an extent inside the inlet passage 13 and exhaust passage 14. The valve motion in the internal combustion engine according to the present invention will be very different from the motion of inlet and exhaust valves controlled by a conventional mechanical cam shaft. The valve motion will comprise different duration valve opening periods, different height lifts and a different number of lifts in each stroke. This will allow the engine valves 15 and 16 to control gas flow, engine load/power and also the timing of combustion within the engine. There will therefore be a reduced need for a throttle system and a reduced need for a spark plug. A spark plug 50 is shown in the FIG. 1, but is used only on start up of the engine or during full load conditions.

The auto-ignition process is already well-known in two-stroke engines. It provides improved fuel consumption, a lower engine emission (principally lower nitrogen oxides, lower hydrocarbons and carbon monoxide) and improved combustion stability. The two-stroke engine is an ideal engine for auto-ignition because auto-ignition relies upon the retention of some exhaust gas in the combustion chamber and a two-stroke engine can easily facilitate this, because the process of scavenging exhaust gases can be controlled to leave the required residual amount of exhaust gas in the mixture of fuel and air ready for combustion. Auto-ignition can provide reproducible combustion time after time.

Control of the motion of the inlet valve 15 and exhaust valve 16 in accordance with the present invention is illustrated with reference to FIGS. 3a, 3b and 3c with FIGS. 2a and 2b giving an operating regime of normal camshaft operated valves for comparison.

Figure 2A:
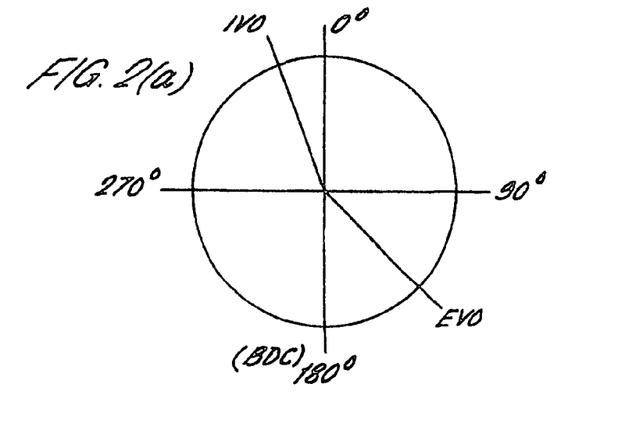
FIGS. 2a and 2b are valve timing diagrams for the exhaust and inlet valves of a single cylinder four-stroke internal combustion engine operating according to a conventional method of operation.
Figure 2B:
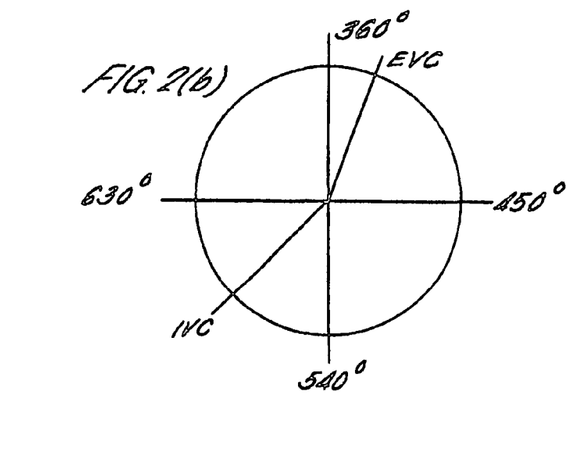

FIGS. 2a and 2b show typical valve motion in a standard four-stroke internal combustion engine. The zero degree position is the beginning of the expansion stroke of the engine. FIG. 2a shows that the exhaust valve opens in the expansion stroke roughly 30 degrees before bottom dead centre and FIG. 2b shows that the exhaust valve remains open throughout the exhaust stroke to close at the beginning of the induction stroke at roughly 10 degrees after top dead centre. FIG. 2a also shows that the inlet valve begins to open at the end of the exhaust stroke about 10 degrees before top dead centre, remains open throughout the induction stroke and FIG. 2b shows that the inlet valve closes in the beginning of the compression stroke at about 45 degrees after bottom dead centre.

Figures 3A, 3B:
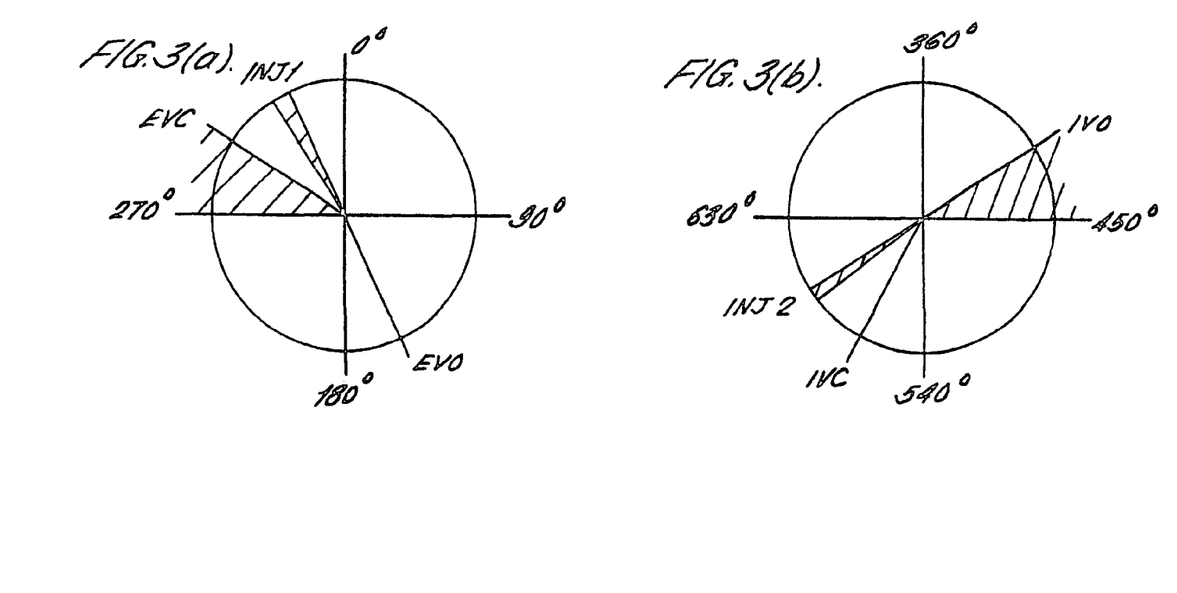
FIGS. 3a, 3b and 3c are valve timing diagrams for the exhaust and inlet valves of a single cylinder four-stroke internal combustion engine operating according to a method of the present invention.

FIGS. 3a and 3b graphically illustrate in a first format exhaust and inlet valve motion according to a first operating regime of the present invention. FIG. 3c illustrates the same valve motion in a second graphical format. The hydraulically operated exhaust valve 16 begins to open at approximately 10 to 15 degrees before bottom dead centre in the expansion stroke, and closes earlier, closing during the exhaust stroke in a range of 90 to 45 degrees before top dead centre. The inlet valve is opened later in the engine cycle than in an ordinary engine, being opened in a range of 45 to 90 degrees after top dead centre in the induction stroke. The inlet valve 15 is then closed roughly 30 degrees after bottom dead centre in the compression stroke.

Figure 3C:
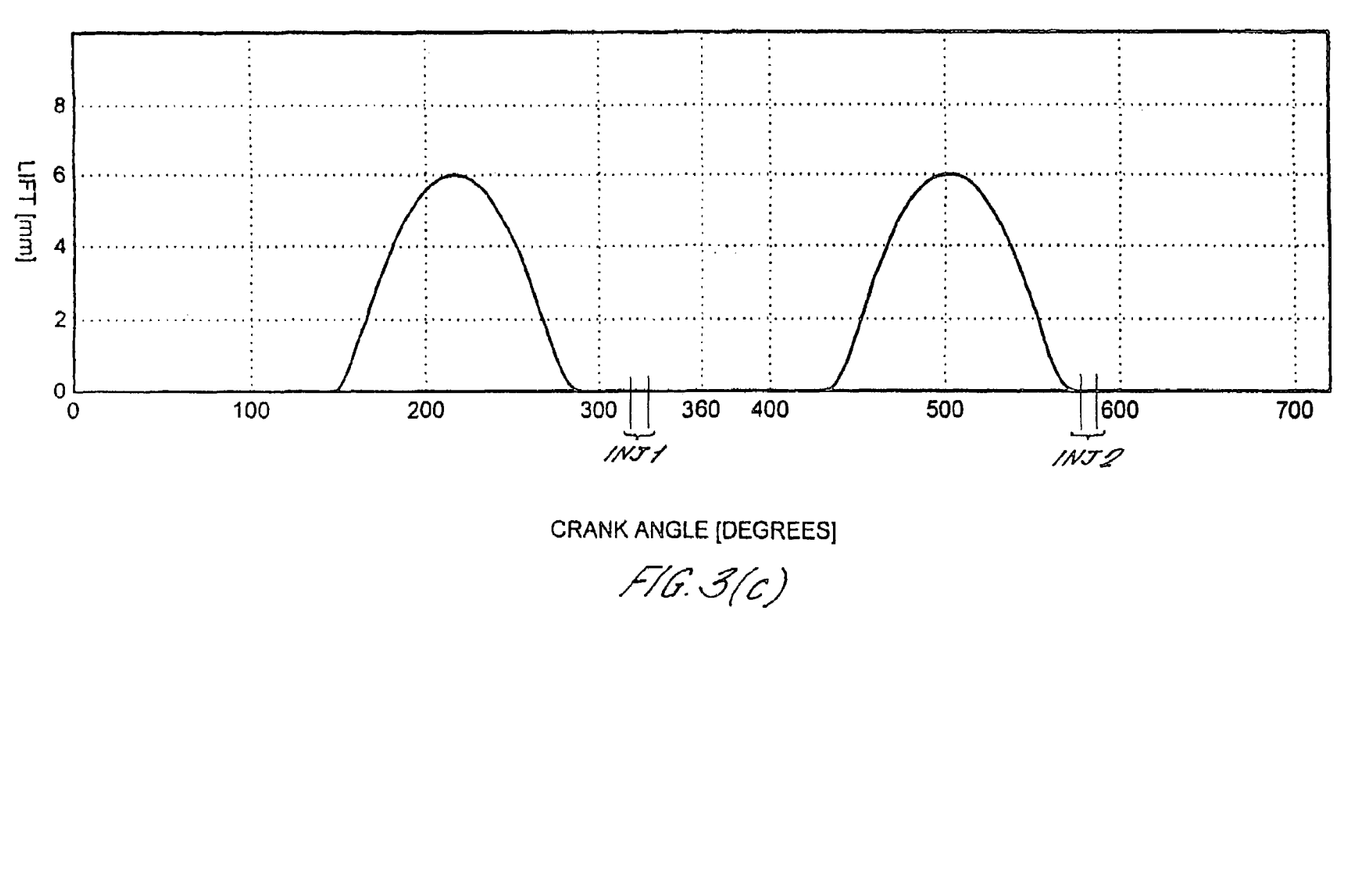

The engine operated according to the cycle illustrated in FIGS. 3a, 3b and 3c is operated to specifically control the flow of gases to achieve auto-ignition of the fuel/air charge in the four-stroke engine. The exhaust valve is controlled to close early during the exhaust stroke and thereby trap a significant volume of exhaust gas inside the combustion chamber 12 for the purpose of generating auto-ignition at the end of the next compression stroke or beginning of the next expansion stroke. When the inlet valve 15 is opened in the induction stroke as shown in FIG. 3 the inlet valve 15 allows a charge of air to enter the combustion chamber 12 and mix with the combusted gases trapped in the immediately preceding exhaust stroke. The mixture of air and combusted gases is subsequently compressed during the compression stroke. The gasoline direct injector 60 will inject fuel directly into the combustion chamber 12, into the mixture of combusted gases and air, either during the induction stroke or during the subsequent compression stroke. This injection period is shown as INJ2 in FIG. 3c and FIG. 3b.

The number of degrees of crankshaft rotation before top dead centre at which the exhaust valve 16 closes is preferably equivalent to the number of degrees after top dead centre at which the inlet valve 15 opens. The reason for this is the trapped combusted gases will be compressed after the closure of the exhaust valve 16 and it is preferred to expand the trapped compressed exhaust gases to the same degree before the inlet valve 16 is opened, so that the pressure in the combustion chamber 12 is not a raised pressure when the inlet valve 16 is opened.

The above method of operation has previously been described in the applicant's International Patent Application No.PCT/GB00/04975. The method works well in part-load conditions, when the engine is performing work to e.g. drive a vehicle, but does not work well at full load or at light load (e.g. idle). It has been discovered that the method of operation is not totally reliable at light loads or high loads, the temperature and/or pressure in the combustion chamber 12 and/or the volume of retained combusted gases being insufficient to give rise to the conditions necessary for auto-ignition. Therefore, when the engine is operating in light load or high load conditions (as determined by the electronic controller 24 from signals received by sensors) the engine operating according to the method of the present invention has a second injection period INJ1 (see again FIG. 3c and also FIG. 3a). In this infection period a small quantity of fuel and air is injected by the direct injector 60 (without an associated opening of the intake valve 17) after the exhaust valve 16 closes during the exhaust stroke and before the intake valve 17 opens during the intake stroke. The injected fuel/air mixture gives rise to a small combustion or partial combustion event. The combustion event is not intended to generate power, but instead has the purpose of raising the temperature or changing the chemistry of the combusted gases trapped by the early closing of the exhaust valve during the exhaust stroke in order to pre-condition the gases in the combustion chamber 12 for subsequent auto-ignition (after the injection of fuel/air mixture during injection period INJ2).

Instead of injecting fuel/air mixture at INJ1 to cause a small combustion event, the mixture could be introduced at a time (e.g. after TDC) when there will be no auto-ignition of the introduced fuel/air mixture. Instead the injection period INJ1 will serve to inject fuel which will have sufficient time to atomise prior to the injection period INJ2 so that the combustion chamber will be preconditioned for auto-ignition subsequent to injection period INJ2. In such a case, fuel alone might be injected (if this is possible) rather than a mixture of fuel and air since no air will be needed for the small combustion event.

There are at least two variants on the timing of the injection period INJ2 operating the direct injector 60. In a first "homogeneous" mode, the fuel would be injected into the combustion chamber 12 during a period INJ2 early in the induction stroke to creates a homogeneous fuel/air charge very similar in nature to that resulting from delivery of fuel/air charge through an inlet passage. In a preferred second "stratified" mode, the injection period INJ2 would take place quite late in the induction stroke, creating a bolus of fuel, which bolus would be provided in a precise location in the combustion chamber 12, the location chosen such that the bolus would be surrounded by a mixture of combusted gases and air ideal for the promotion of auto-ignition.

Figure 4:
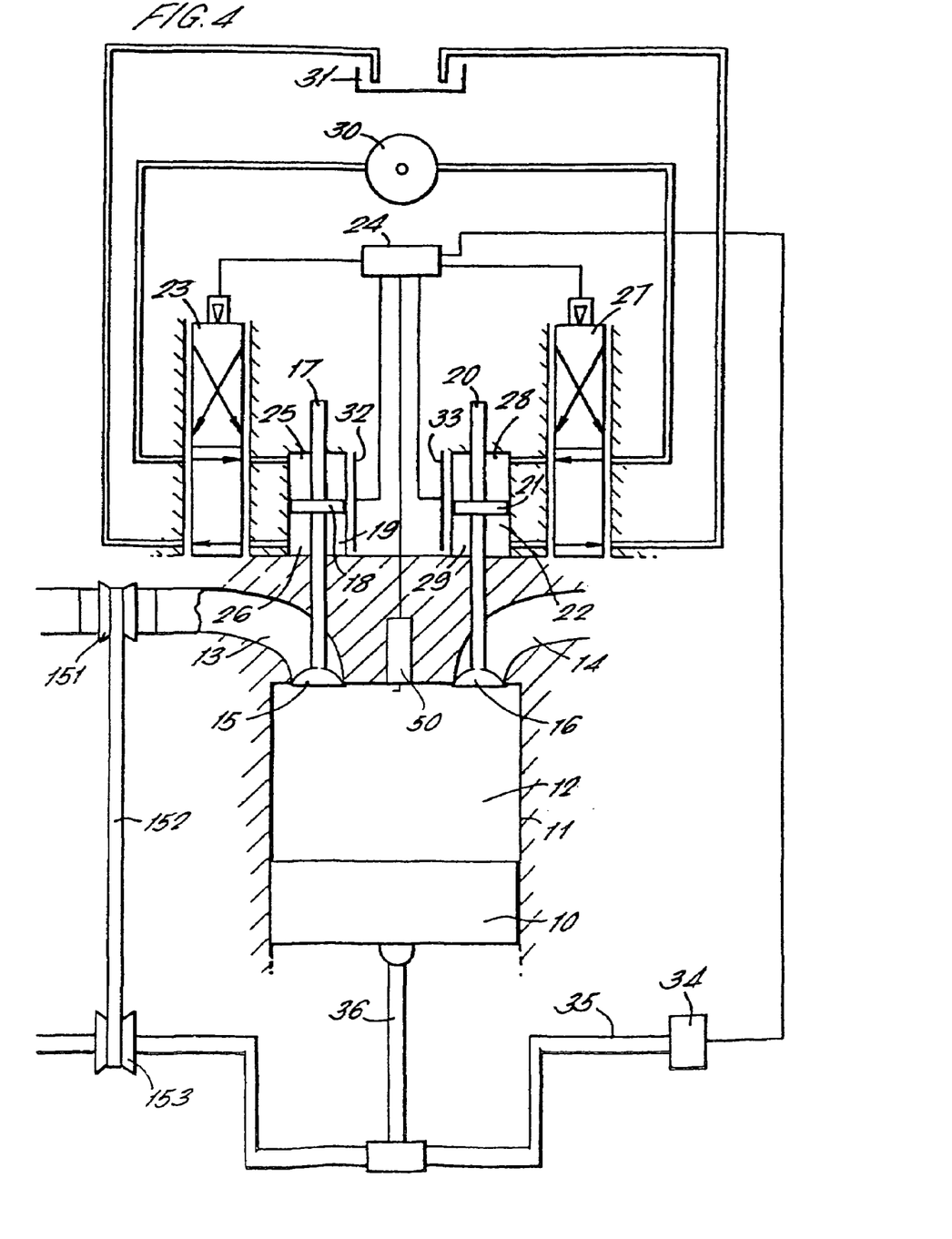
FIG. 4 is a schematic illustration of a second embodiment of single cylinder four-stroke engine according to the present invention.

A second type of engine operated according to the present invention is illustrated in FIG. 4. This engine is virtually identical to the engine of FIG. 1 and identical components are given identical reference numerals. However, the engine does not have a direct injection device. Instead a fuel/air mixture is delivered via the inlet passage 13. The fuel/air mixture is forced into the combustion chamber 12 by a supercharger 151 driven by a belt 152 which runs around a flywheel 153 mounted on the crankshaft 35.

Figure 5:
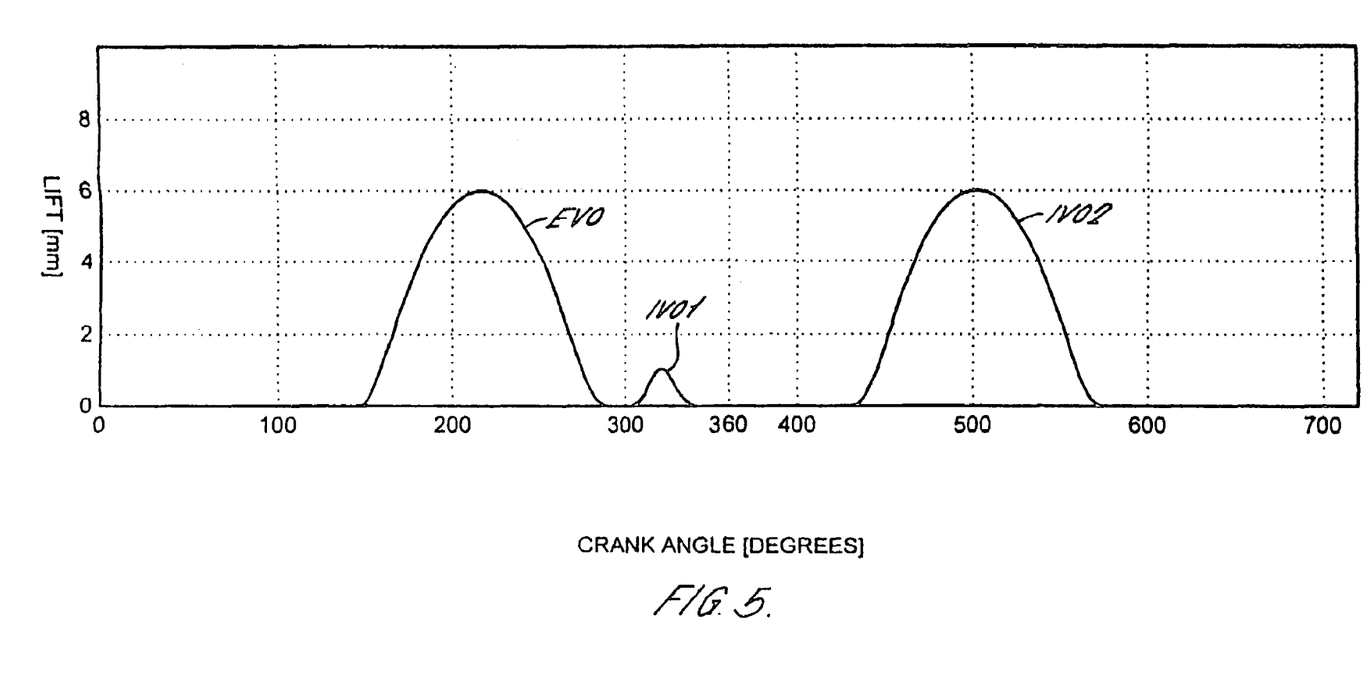
FIG. 5 is a valve timing diagram for the exhaust and inlet valves of the single cylinder four-stroke internal combustion engine of FIG. 4 operating according to a method of the present invention.

The valve motion of the engine is as illustrated in FIG. 5. The exhaust valve opening is shown as EVO. As before, the exhaust valve 16 is closed before the end of the exhaust stroke to trap combusted gases. After the exhaust valve 16 has closed then the inlet valve 15 is opened to a small degree and for a small duration at IVO1 and a small charge of fuel/air is forced into the combustion chamber by the supercharger. The inlet valve 15 is closed prior to being re-opened during the intake stroke for a second main induction period IVO2. The small charge introduced during period IVO1 can ignite in a small combustion event to raise the temperature of the gases in order to pre-condition the combustion chamber for auto-ignition after the main charge is introduced during IVO2 (i.e. during the intake stroke). Alternatively, the fuel introduced as part of the small charge vaporises and fragments in the combustion chamber during the period between the closing of the intake valve at the end of IVO1 and the opening of the intake valve at the start of IVO2, thereby pre-conditioning the combustion chamber for auto-ignition of the charge introduced during the period IVO2.

As with the FIG. 1 embodiment the mixture of combusted gases, air and fuel in the combustion chamber following the end of the induction period IVO2 combusts due to auto-ignition and expands during the power stroke.

Whilst the inlet valve 15 and exhaust valve 16 in the above embodiments are both hydraulically actuated, they could be valves actuated purely electrically or by electromagnetic forces or mechanical means.

It has been found that an engine operating according to the operating regimes described above does not need heating of the fresh air charge before delivery of the charge of the combustion chamber 12. Other engines have found charge pre-heating necessary to promote auto-ignition.

What is claimed is:

1. A method of operating a four-stroke internal combustion engine having an exhaust stroke and an intake stroke, and including inlet valve means to regulate flow of air into a combustion chamber, exhaust valve means to regulate flow of combusted gases from the combustion chamber, and injection means to inject fuel directly into the combustion chamber, the method comprising the steps of:
    closing the exhaust valve means prior to the end of the exhaust stroke to trap combusted gases in the combustion chamber;
    injecting fuel directly into the combustion chamber into the combusted gases trapped in the combustion chamber after closing of the exhaust valve;
    opening the inlet valve means during the intake stroke following the step of injecting fuel directly into the combustion chamber into the combusted gases to admit charge air into the combustion chamber to be mixed with the previously trapped combusted gases; and
    injecting fuel directly into the combustion chamber into the mixture of the trapped combusted gases and the charge air introduced during the intake stroke under control of the inlet valve means; whereby:
    in the combustion chamber conditions are generated which enable the mixture of fuel, air and combusted gases to combust by auto-ignition with the combusted gases expanding during the power stroke; and wherein:
    said steps of injecting fuel comprise injecting said fuel with an air assist fuel injector which uses compressed air to entrain fuel to be delivered into the combustion chamber.

2. A method of operating a four-stroke internal combustion engine having an exhaust stroke and an intake stroke, and including inlet valve means to regulate flow of air into a combustion chamber, exhaust valve means to regulate flow of combusted gases from the combustion chamber, and injection means to inject fuel directly into the combustion chamber, the method comprising the steps of:
    closing the exhaust valve means prior to the end of the exhaust stroke to trap combusted gases in the combustion chamber;
    injecting fuel directly into the combustion chamber into the combusted gases trapped in the combustion chamber after closing of the exhaust valve;
    opening the inlet valve means during the intake stroke following the step of injecting fuel directly into the combustion chamber into the combusted gases to admit charge air into the combustion chamber to be mixed with the previously trapped combusted gases; and
    injecting fuel directly into the combustion chamber into the mixture of the trapped combusted gases and the charge air introduced during the intake stroke under control of the inlet valve means; whereby:
    in the combustion chamber conditions are generated which enable the mixture of fuel, air and combusted gases to combust by auto-ignition with the combusted gases expanding during the power stroke; and wherein:
    said steps of injecting fuel comprise injecting said fuel with an air assist fuel injector which uses compressed air to entrain fuel to be delivered into the combustion chamber, and wherein air is introduced into said trapped combusted gases prior to the intake stroke, and wherein the fuel injected and the air introduced combust by auto-ignition prior to opening of the intake valve means during the intake stroke.

3. A method of operating a four-stroke internal combustion engine having an exhaust stroke and an intake stroke, and including inlet valve means to regulate flow of air into a combustion chamber, exhaust valve means to regulate flow of combusted gases from the combustion chamber, and injection means to inject fuel directly into the combustion chamber, the method comprising the steps of:
    closing the exhaust valve means prior to the end of the exhaust stroke to trap combusted gases in the combustion chamber;
    injecting fuel directly into the combustion chamber into the combusted gases trapped in the combustion chamber after closing of the exhaust valve;
    opening the inlet valve means during the intake stroke following the step of injecting fuel directly into the combustion chamber into the combusted gases to admit charge air into the combustion chamber to be mixed with the previously trapped combusted gases; and
    injecting fuel directly into the combustion chamber into the mixture of the trapped combusted gases and the charge air introduced during the intake stroke under control of the inlet valve means; whereby:
    in the combustion chamber conditions are generated which enable the mixture of fuel, air and combusted gases to combust by auto-ignition with the combusted gases expanding during the power stroke; and wherein:
    said steps of injecting fuel comprise injecting said fuel with an air assist fuel injector which uses compressed air to entrain fuel to be delivered into the combustion chamber, and wherein the fuel injected into the mixture of the trapped combusted gases and the charge air introduced under control of the inlet valve means is injected in an early part of the intake stroke so that the fuel mixes with the air and the combusted gases to form a substantially homogeneous mixture prior to auto-ignition.

4. A method of operating a four-stroke internal combustion engine having an exhaust stroke and an intake stroke, and including inlet valve means to regulate flow of air into a combustion chamber, exhaust valve means to regulate flow of combusted gases from the combustion chamber, and injection means to inject fuel directly into the combustion chamber, the method comprising the steps of:
    closing the exhaust valve means prior to the end of the exhaust stroke to trap combusted gases in the combustion chamber;
    injecting fuel directly into the combustion chamber into the combusted gases trapped in the combustion chamber after closing of the exhaust valve;
    opening the inlet valve means during the intake stroke following the step of injecting fuel directly into the combustion chamber into the combusted gases to admit charge air into the combustion chamber to be mixed with the previously trapped combusted gases; and
    injecting fuel directly into the combustion chamber into the mixture of the trapped combusted gases and the charge air introduced during the intake stroke under control of the inlet valve means; whereby:
    in the combustion chamber conditions are generated which enable the mixture of fuel, air and combusted gases to combust by auto-ignition with the combusted gases expanding during the power stroke; and wherein:
    said steps of injecting fuel comprise injecting said fuel with an air assist fuel injector which uses compressed air to entrain fuel to be delivered into the combustion chamber, and wherein the fuel injected into the mixture of the trapped combusted gases and the charge air introduced under control of the inlet valve means is injected at the end of the intake stroke or at the beginning of the compression stroke only after the inlet valve means has stopped flow of air into the combustion chamber.

5. A method of operating a four stroke internal combustion engine having an exhaust stroke, an intake stroke, and a power stroke, and including inlet valve means to regulate admission of a mixture of fuel and air into a combustion chamber, a compressor to compress the fuel and air mixture prior to admission of the mixture into the combustion chamber, and exhaust valve means to regulate flow of combusted gases from the combustion chamber, the method comprising the steps of:

closing the exhaust valve means prior to the end of the exhaust stroke to trap combusted gases in the combustion chamber;

opening the inlet valve means to admit a preconditioning charge of fuel and air into the combustion chamber to be mixed with the trapped combusted gases after closing of the exhaust valve means during the exhaust stroke and prior to opening of the inlet valve means in the intake stroke; and opening the inlet valve means during the intake stroke to admit a charge of fuel and air mixture into the combustion chamber to be mixed with the previously trapped combusted gases; whereby:

in the combustion chamber conditions are generated which enable the mixture of fuel, air and combusted gases to combust by auto-ignition, with the combusted gases expanding during the power stroke.

6. A method of operating a four stroke internal combustion engine having an exhaust stroke, an intake stroke, and a power stroke, and including inlet valve means to regulate admission of a mixture of fuel and air into a combustion chamber, a compressor to compress the fuel and air mixture prior to admission of the mixture into the combustion chamber, and exhaust valve means to regulate flow of combusted gases from the combustion chamber, the method comprising the steps of:

closing the exhaust valve means prior to the end of the exhaust stroke to trap combusted gases in the combustion chamber;

opening the inlet valve means to admit a preconditioning charge of fuel and air into the combustion chamber to be mixed with the trapped combusted gases after closing of the exhaust valve means during the exhaust stroke and prior to opening of the inlet valve means in the intake stroke; and opening the inlet valve means during the intake stroke to admit a charge of fuel and air mixture into the combustion chamber to be mixed with the previously trapped combusted gases; whereby:

in the combustion chamber conditions are generated which enable the mixture of fuel, air and combusted gases to combust by auto-ignition, with the combusted gases expanding during the power stroke, and wherein the combustion chamber is a variable volume chamber defined in a cylinder by a piston reciprocating in the cylinder and wherein the opening and closing of the inlet and the exhaust valve means are controlled by an electronic processor which operates according to a program of instructions and which receives an input signal indicative of the position of the piston reciprocating in the cylinder.

7. A method as claimed in claim 6 wherein the exhaust valve means comprises a hydraulically actuated exhaust valve and the inlet valve means comprises a hydraulically actuated inlet valve, both the exhaust valve and the inlet valve being controlled by the electronic processor.

8. A method as claimed in claim 7, wherein the hydraulically actuated valves are poppet valves.

9. A four-stroke internal combustion engine operated according to a method as claimed in claim 1.

10. A method as claimed in claim 2 wherein the fuel injected into the mixture of the trapped combusted gases and the charge air introduced under control of the inlet valve means is injected in an early part of the intake stroke so that the fuel mixes with the air and the combusted gases to form a substantially homogeneous mixture prior to auto-ignition.

11. A method as claimed in claim 2 wherein the fuel injected into the mixture of the trapped combusted gases and the charge air introduced under control of the inlet valve means is injected at the end of the intake stroke or at the beginning of the compression stroke only after the inlet valve means has stopped flow of air into the combustion chamber.

12. A method of operating a four stroke internal combustion engine having an exhaust stroke, an intake stroke, and a power stroke, and including inlet valve means to regulate admission of a mixture of fuel and air into a combustion chamber, a compressor to compress the fuel and air mixture prior to admission of the mixture into the combustion chamber, and exhaust valve means to regulate flow of combusted gases from the combustion chamber, the method comprising the steps of:

closing the exhaust valve means prior to the end of the exhaust stroke to trap combusted gases in the combustion chamber;

opening the inlet valve means to admit a preconditioning charge of fuel and air into the combustion chamber to be mixed with the trapped combusted gases after closing of the exhaust valve means during the exhaust stroke and prior to opening of the inlet valve means in the intake stroke; and opening the inlet valve means during the intake stroke to admit a charge of fuel and air mixture into the combustion chamber to be mixed with the previously trapped combusted gases; whereby:

in the combustion chamber conditions are generated which enable the mixture of fuel, air and combusted gases to combust by auto-ignition, with the combusted gases expanding during the power stroke, and wherein the combustion chamber is a variable volume chamber defined in a cylinder by a piston reciprocating in the cylinder and wherein the opening and closing of the inlet and the exhaust valve means are controlled by an electronic processor which operates according to a program of instructions and which receives an input signal indicative of the position of the piston reciprocating in the cylinder.

13. A method as claimed in claim 12, wherein the exhaust valve means comprises a hydraulically actuated exhaust valve and the inlet valve comprises a hydraulically actuated inlet valve, both the exhaust valve and the inlet valve being controlled by the electronic processor.

14. A method as claimed in claim 13, wherein the hydraulically actuated valves are poppet valves.

15. A four-stroke internal combustion engine operated according to a method as claimed in claim 5.

* * * * *